June 9, 1936.  C. T. DOMAN  2,043,531
AIR COOLED INTERNAL COMBUSTION ENGINE
Filed July 7, 1933  2 Sheets-Sheet 1

INVENTOR.
Carl T. Doman
BY Bodell & Thompson
ATTORNEYS.

June 9, 1936.  C. T. DOMAN  2,043,531
AIR COOLED INTERNAL COMBUSTION ENGINE
Filed July 7, 1933  2 Sheets-Sheet 2
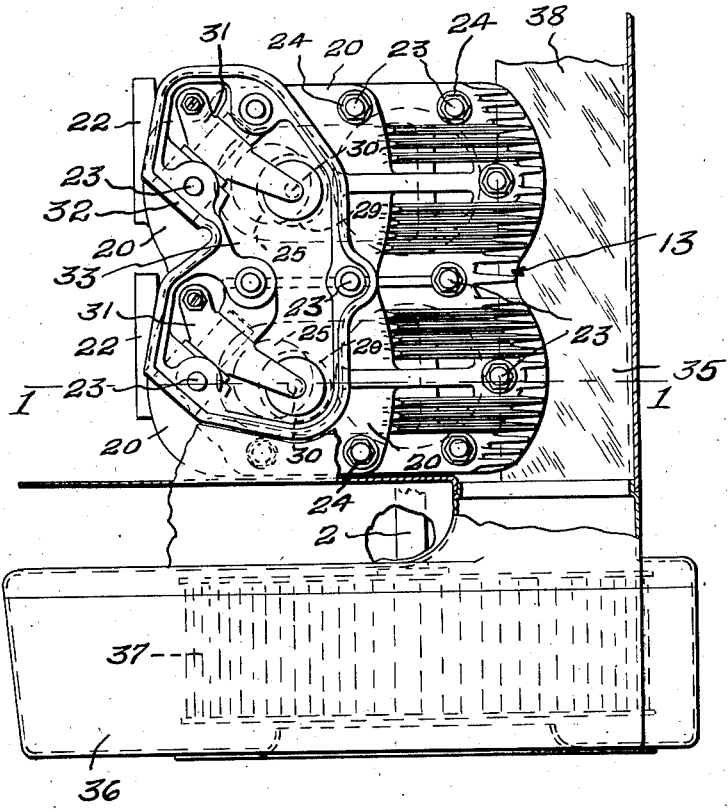
Fig-2-
INVENTOR.
Carl T. Doman.
BY Bridell & Thompson
ATTORNEYS.

Patented June 9, 1936

2,043,531

UNITED STATES PATENT OFFICE 2,043,531

AIR COOLED INTERNAL COMBUSTION ENGINE

Carl T. Doman, Syracuse, N. Y., assignor to Doman & Marks, Syracuse, N. Y., a co-partnership composed of Carl T. Doman and Edward S. Marks Application July 7, 1933, Serial No. 679,390

2 Claims. (Cl. 123—171)

This invention relates to air cooled internal combustion engines and has for its object an arrangement of the valves in an air cooled engine, whereby the head is exposed throughout its greater area directly to the cooling air current and also the exhaust valve port directly exposed to the cooling air current, and also an arrangement of the valves whereby different cooling air currents, or different portions of the same cooling air current, impinge against the barrels of the cylinders, and against the top of the head and the exhaust ports.

It further has for its object an air cooled engine of the F head type with the exhaust valve leading upwardly from the top of the F chamber, leaving the greater part of the head exposed to the cooling air current and the intake port exposed to a cooling air current in which the air currents are blown transversely of the cylinders and the valves located on the lee side of the cylinders with respect to the direction of the air current, whereby the barrels of the cylinders, sides and tops of the heads and the exhaust port are all impinged directly by the cooling air current.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 2 is a fragmentary plan view of a pair of cylinders.

Figure 1:
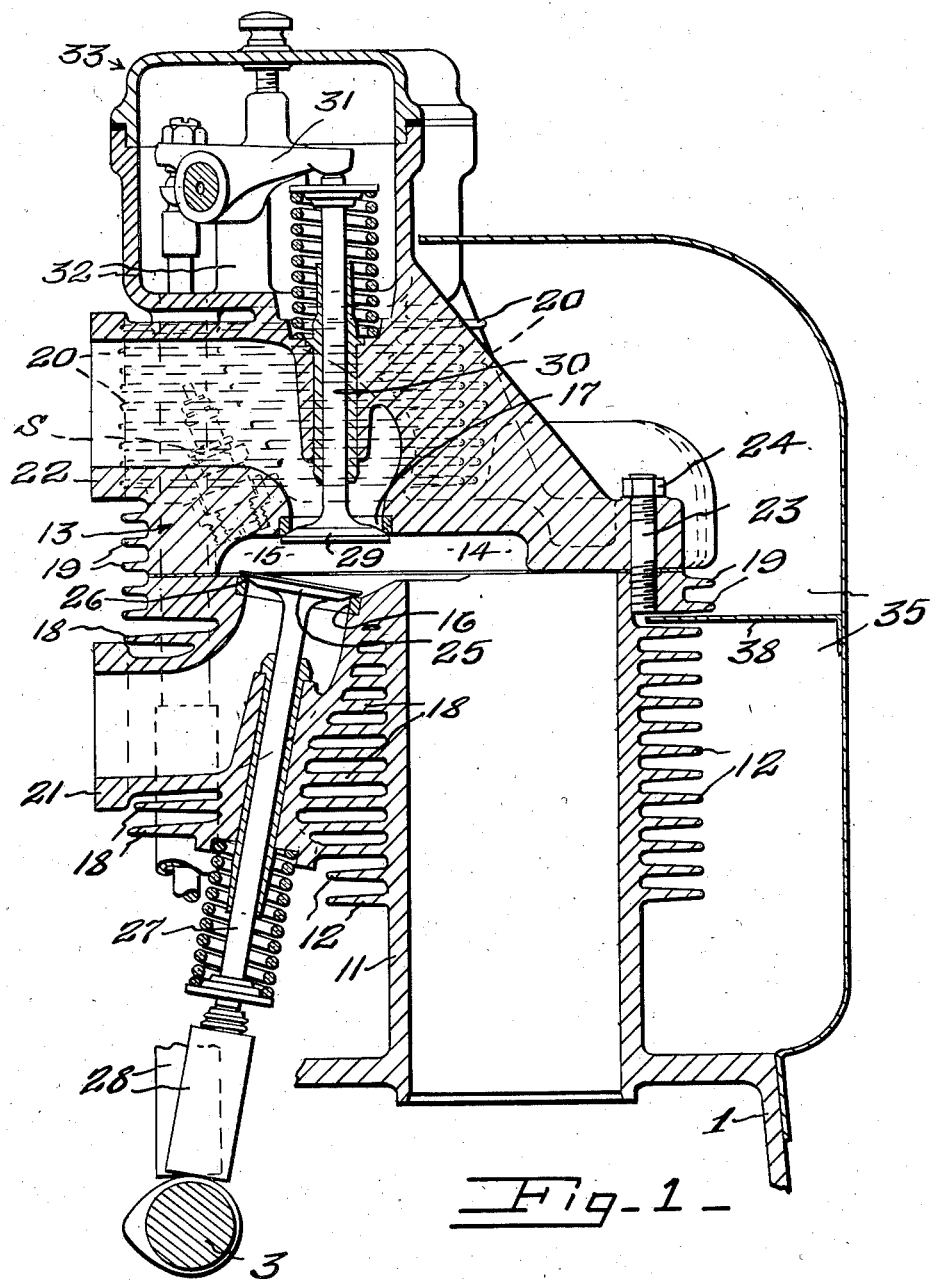
Figure 1 is a vertical sectional view through the engine cylinder body of an engine embodying my invention, looking in the direction of the axis of the crank shaft, and on the plane l—l, Figure 2.

One of the more important problems in air cooled engines is quickly and efficiently cooling the head, or combustion chamber, and the exhaust valve, and this invention has for its principal object the relative location of the exhaust valve with respect to the cylinder and the air cooling current, and the location of the intake valve which is relatively cold, so as not to obstruct the air currents cooling the cylinder, cylinder head and exhaust valve.

I have here shown my invention as embodied in a line air cooled internal combustion engine in which the cylinders are arranged in pairs, and a pair of cylinders only is shown.

This air cooled engine comprises a cylinder having a head formed with a compression chamber including an offset portion at one side of, or overhanging the cylinder, intake and exhaust ports opening into the compression chamber, the exhaust port opening through the top wall of the head into said offset portion.

More specifically, this air cooled internal combustion engine comprises generally, cylinders having heads formed with offsets overhanging the cylinders on one side thereof, as cylinders of the F head type, the intake ports of the cylinders leading from the bottom walls of the offsets or from the bottom walls of the F chambers, exhaust ports leading upwardly from the top walls of the offsets or F chambers, lower and upper valves for controlling said ports, the upper valves, which control the exhaust ports, being overhead valves, the valve operating mechanism including overhead rocker arms operating the exhaust valves, this being mounted on rocker arm supports integral with the heads and located well above the top walls of the heads, in order not to obstruct the cooling air currents from striking the heads and the exhaust ports, suitable means for creating an air current or air currents blowing crosswise from one side of the cylinders to the other, the ports, and particularly the exhaust ports, being located on the lee side of the cylinders with respect to the direction of air current.

The valve arrangement differs from that of the usual F head construction, for the reason that the exhaust valve port leads from the top side of the F chamber in order to be located in, or exposed directly to, the transversely flowing cooling air current. Preferably, there is a head common to each pair of cylinders, and the heads are secured to the cylinders in any well known manner, as by the usual studs and nuts.

The intake ports are in the form of an elbow extending downwardly and laterally from the lower wall of the F head and the exhaust ports are also in the form of an elbow extending upwardly and laterally from the top wall of the F head, these ports being provided with suitable flanges for coupling to the intake and exhaust manifolds.

I designates the crank casing of the engine; 2 the crank shaft; 3 the cam shaft, all of which may be of any well known form, size and construction.

II designates the barrels of the cylinders mounted on the crank casing, these being formed with transversely-extending, or horizontally-extending, heat radiating flanges 12.

13 designates the heads of the cylinders, and as before stated, there is usually a head common to each pair of cylinders, each head being provided with a compression chamber 14 for each cylinder of the pair and with an offset or F chamber 15 overhanging one side of the cylinder.

16 is an intake port leading from the bottom wall of the F chamber 15 and being in the form of an elbow extending downwardly and laterally.

17 is an exhaust port leading from the top wall of the offset or F chamber, this being also in the form of an elbow. The intake port 16 is formed with heat radiating flanges 18, preferably forming continuations of some of the heat radiating flanges 12 of the barrel of the cylinder.

The head is also formed with transversely-extending heat radiating flanges 19 and also the exhaust port 17 is formed with transversely-extending heat radiating flanges 20. Both these ports are provided with suitable flanges 21, 22 for coupling to the intake and exhaust manifolds, not shown.

23 are studs, and 24 nuts threading on the studs for securing the heads to the barrels of the cylinders. Usually, the cylinder is of cast iron and the head of aluminum, although this feature forms no part of this invention.

25 designates the intake valve, that is, the valve for controlling the intake port 16, this valve coacting with a seat 26 in the bottom wall of the F chamber at an inclined angle to the axis of the barrel of the cylinder in order that the stem 27 of the valve may coact directly with the lift rod, which through suitable compensating mechanism at 28 to take up clearances, coacts with a cam on the cam shaft 3. The compensating mechanism is preferably of the hydraulic type and forms no part of this invention. The valve stem and lift rod are inclined because on account of the timing gears between the crank shaft and the cam shaft, it is necessary to locate the cam shaft laterally such a distance that a vertical lift rod can not be used.

29 designates the exhaust valve having an upwardly extending stem 30. The valve mechanism for the exhaust valve is of the overhead type and includes a rocker arm 31 suitably mounted on a rocker arm support 32 mounted on the head structure and formed integral therewith, the rocker arm support being spaced apart from the top surface of the head in order not to interfere with the cooling air current striking the top surface of the head and the exhaust port 17.

The rocker arm 31 is actuated in the usual manner by a push rod coacting with a cam shaft through a compensating mechanism, as 28. The rocker arms are enclosed in a suitable box 33 and they may be oiled in any well known manner.

The engine is cooled by blowing air currents from one side of the line of cylinders to the other, and the intake and exhaust ports are located on the lee side of the cylinders. The air current system includes a conduit 35 extending lengthwise of the line of cylinders and open at its side toward the cylinders, the conduit communicating with a fan housing 36 in which is located a fan rotor 37 mounted on, or connected to, the crank shaft of the engine. The conduit 35 is provided with a lengthwise partition 38 dividing the air current into two air currents, one of which blows against the barrels of the cylinders, and the other of which blows against the head of the cylinder and the top wall thereof, and against the flanged exhaust port. The intake port is provided with flanges which are continuations of the flanges on the barrels of the cylinders in order to facilitate the conducting of the heat from the barrels of the cylinders, and the incoming comparatively cool charge in the intake port is heated by the heat conducted from the flanges of the barrels of the cylinders.

S designates the spark plug. This is located with its points in the hottest portion of the chamber 14, or near the exhaust valve seat. The heat conducting flanges of the head are notched, or cut away, to provide a passage through which the spark plug is accessible.

Owing to the F head modified by having the exhaust port leading from the top of the F chamber and the arrangement thereof relative to the direction of the air flow, maximum cooling surface is provided for the head, particularly the top wall thereof, and also maximum cooling surface is provided for the exhaust port and exhaust valve.

What I claim is:

1. In an air cooled engine, the combination of a cylinder having a combustion chamber and a detachable head including a lateral extension of said combustion chamber, means forming an air passage along one side of the cylinder and its head, said cylinder having an integral portion thereof below the lateral extension of the combustion chamber and at the lee side of the cylinder, provided with a valved inlet port protected by the cylinder from the cooling air of the said passage and drawing heat from the cylinder for warming the charges in the inlet port, said head having an exhaust port at its lee side, rising from the combustion chamber extension and with its major portion in the path of the air stream around the head, an exhaust valve in the said port having a stem upstanding through the head, valve actuating connections including a rocker arm engaging the upstanding end of the exhaust valve, and a box atop the head and enclosing the rocker arm and engaged end of the exhaust valve stem, the remaining surfaces of the head and cylinder presenting full unobstructed exposure to the air passing through the said air passage.

2. In an air cooled engine, the combination of a cylinder having a combustion chamber and a detachable head including a lateral extension of said combustion chamber, means forming an air passage along one side of the cylinder and its head, said cylinder having an integral portion thereof below the lateral extension of the combustion chamber and at the lee side of the cylinder, provided with a valved inlet port protected by the cylinder from the cooling air of the said passage and drawing heat from the cylinder for warming the charges in the inlet port, said head having an exhaust port at its lee side, rising from the combustion chamber extension and with its major portion in the path of the air stream around the head, an exhaust valve in the said port having a stem upstanding through the head, valve actuating connections including a rocker arm engaging the upstanding end of the exhaust valve, a box atop the head and enclosing the rocker arm and the engaged end of the exhaust valve stem, and means horizontally dividing the said air passage adjacent to the upper end of the cylinder whereby separate air currents are deflected around the cylinder and around the head along its exhaust port.

CARL T. DOMAN.